UNITED STATES PATENT OFFICE.

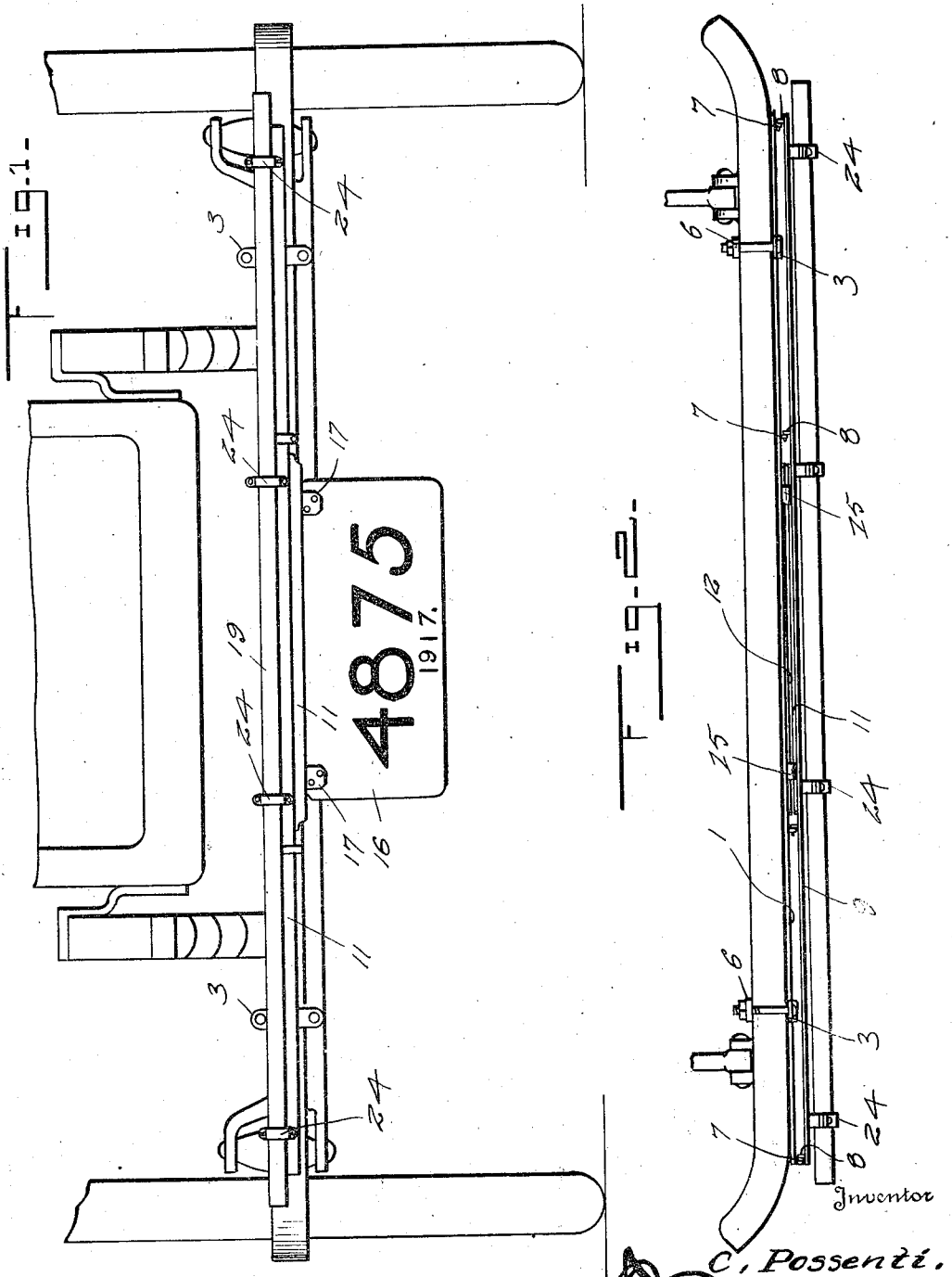

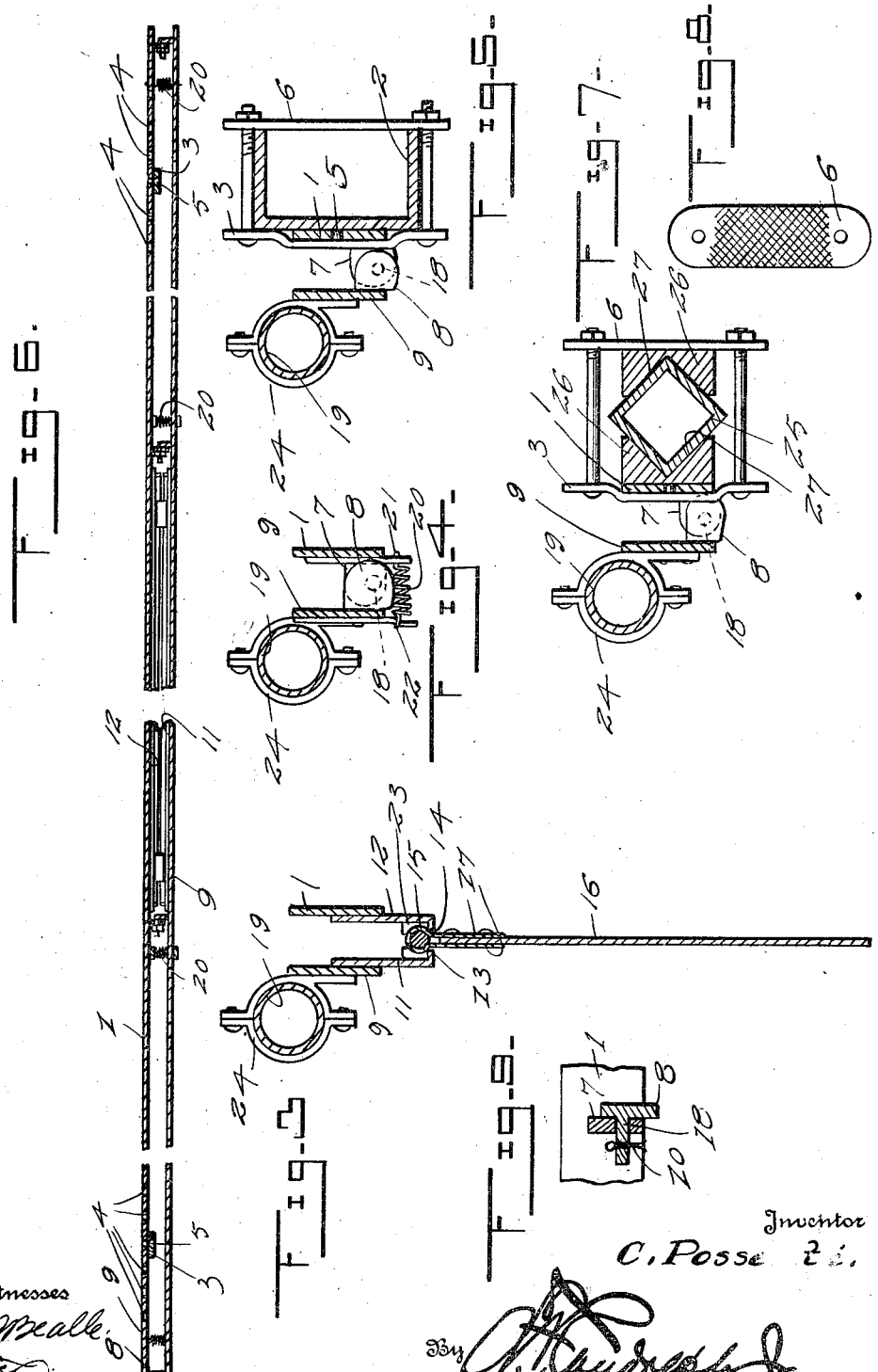

CINNA POSSENTI, OF NEW YORK, N. Y.

AUTOMATIC IDENTIFICATION-FENDER FOR AUTOMOBILES.

1,259,665.  Specification of Letters Patent.  Patented Mar. 19, 1918.

Application filed April 19, 1917. Serial No. 163,193.

*To all whom it may concern:*

Be it known that I, CINNA POSSENTI, a citizen of the United States, residing at New York, in the county of New York and State of New York, have invented certain new and useful Improvements in Automatic Identification-Fenders for Automobiles; and I do hereby declare the following to be a full, clear, and exact description of the invention, such as will enable others skilled in the art to which it appertains to make and use the same.

The invention relates to an automatic identification fender for automobiles.

The object of the present invention is to provide a simple, practical and efficient device of strong, durable and inexpensive construction adapted to be readily applied to various types of cars and capable of being used in connection with or independently of the ordinary fender and adapted, in event of an accident or the fender coming in contact with a person or other object, to automatically release the license of the car and cause the same to fall upon the ground so that it will be impossible for a car to strike a person or other object with its fender without being fully identified, whereby reckless driving will be reduced to a minimum.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is an elevation of a car provided with an automatic identification fender constructed in accordance with this invention.

Fig. 2 is a plan view of the same.

Fig. 3 is a vertical sectional view of the license and the fender.

Fig. 4 is a vertical sectional view illustrating the means for hinging the movable supporting bar and the means for maintaining the jaws of the holding device normally closed.

Fig. 5 is a vertical sectional view illustrating the construction of the fastening means for securing the device to a car.

Fig. 6 is a longitudinal sectional view.

Fig. 7 is a sectional view showing the device applied to another form of fender bar.

Fig. 8 is a detail view of one of the clip plates.

Fig. 9 is a detail sectional view of one of the hinges for connecting the supporting bars or members.

Like numerals of reference designate corresponding parts in the several figures of the drawings.

In the accompanying drawings, in which is illustrated the preferred embodiment of the invention, the automatic identification fender, for automobiles and various other motor vehicles, comprises in its construction a relatively fixed supporting bar 1 adapted to be mounted on an ordinary fender 2 by means of brackets 3 and having a plurality of perforations 4 adapted to receive integral studs or pins 5 of the brackets, whereby the adjustable bar and the brackets may be arranged to suit the width of a car, the length of the fender or the other means for supporting the device in position. The brackets may be secured to the fender 2 by fastening means, such as clips 6 which are adapted to embrace the ordinary fender, as shown, but any other suitable fastening means may of course be employed.

The relatively fixed supporting bar is provided with hinge elements 7 adapted to engage hinge elements 8 of a relatively movable supporting bar 9 extending longitudinally of the relatively fixed supporting bar in substantial parallelism therewith and in spaced relation with the same. The hinge elements 7 are provided with integral pintle portions which engage eyes or openings of the hinge elements 8 and which are retained in engagement with the same by a cotter pin or key 10. The hinges are arranged at suitable intervals and the parts may be readily separated and assembled when required. The relatively fixed and movable supporting bars are provided at their central portions with depending jaws or clamping members 11 and 12 having inwardly extending lower edges or flanges 13 and 14 adapted to engage weighted heads 15 of a license 16. The license 16 is in the form of a plate of the ordinary construction and it is provided with the weighted heads 15 having attaching flanges 17 which are riveted or otherwise secured to the license. The jaws or clamping members 11 and 12 extend below the lower edges of the supporting bars and the pintles or pivots 18 of the hinges of the said supporting bars are located below the longitudinal centers of the same so that the relatively movable supporting bar, which carries a fender bar 19, is adapted to operate as a lever to open the jaws or clamping members and release the license and permit the same to fall should the fender bar 19 come in contact with a person or other object. The jaws are maintained normally closed by springs 20 having their terminals 21 and 22 secured in perforations of the fixed and relatively movable supporting bars. The heads 15 of the license plates are round and the license is adapted to swing incident to a sudden stopping of the machine or starting of the same without liability of the heads 15 becoming disengaged from the clamping jaws or members. The weights on the license will cause the same to drop quickly when the fender bar comes in contact with an object and when the said fender bar strikes a person or other object it is forced inwardly or rearwardly, thereby opening the clamping jaws or members against the action of the springs and releasing the heads 15. The inwardly extending flanges are inclined downwardly and inwardly and permit the license to drop instantly the jaws or clamping members are opened. The flanges 12 are provided at their ends with lugs or stops 23 adapted to prevent the license from moving longitudinally out of engagement with the jaws or clamping members. As the space between the longitudinal supporting bars is open at the top the license may be readily introduced into the clamping device from the top by dropping it into the same. It will thus be clear that it will be impossible for an automobile or other motor vehicle equipped with the improved device to strike a person or other object and escape without detection, as the license will fall and it will be necessary for the machine to stop and recover the license which will indicate the owner of the machine should he fail to stop.

The fender bar 19, which may be straight or curved, is secured to the movable supporting bar by suitable clamps 24 of any desired construction and it is located a considerable distance above the horizontal plane of the pivotal points of the movable supporting bar so that the jaws or members are readily opened against the action of springs which are sufficiently strong to maintain the clamping members firmly in engagement with the license under ordinary conditions.

The device is adapted to display the license at the front of the machine in a conspicuous position besides automatically dropping the license when the fender is forced rearwardly or inwardly by coming in contact with a person or other object.

When the device is applied to a tubular rectangular fender bar 25, suitable jaws 26 having recesses 27 to fit the corners of the fender bar 25, will be employed.

What is claimed is:

1. An automatic identification fender including a clamp having jaws or members arranged to extend along and engage a license at the top thereof, and a fender bar connected with the clamp and adapted to open the same when the fender comes in contact with a person or other object, and means for yieldably maintaining the clamp normally in engagement with the license.

2. An automatic identification fender including a license clamp composed of relatively fixed and movable members arranged substantially horizontally and adapted to extend along and engage a license at the top thereof, means for securing the relatively fixed member to a machine, means for normally holding the said members in engagement with a license, and a fender bar connected with the relatively movable member and arranged to open the same when the fender bar comes in contact with an object.

3. An automatic identification fender including relatively fixed and movable supporting bars hinged together and having means for engaging a license for supporting the same, springs connecting the bars for maintaining the said means in engagement with the license, and means for securing the relatively fixed bar to a machine, and a fender bar mounted on the relatively movable bar and located beyond the pivotal point of the same to form a lever for opening the said means to release the license.

4. An automatic identification fender including spaced fixed and relatively movable supporting bars hinged together and provided with depending jaws or clamping members adapted to engage a license for supporting the same, a fender bar mounted on the movable supporting bar above the point of hinging of the same, springs connecting the supporting bars, and means for mounting the relatively fixed supporting bar on a car.

5. An automatic identification fender including relatively fixed and movable supporting bars hinged together and provided with depending jaws or clamping members having terminal lugs and adapted to engage a license, means for yieldably maintaining the said jaws in engagement with the license, and a fender bar mounted on the movable bar above the point of hinging of the same.

6. An automatic identification fender including fixed and movable supporting members hinged together and provided with clamping jaws or members adapted to engage a license, the fixed member being provided at intervals with perforations, brackets having studs for engaging the perforations, fastening means for securing the brackets to an automobile or other motor vehicle, and a fender bar carried by the movable member and adapted to open the jaws when it comes in contact with an object.

In testimony whereof I affix my signature in presence of two witnesses.

CINNA POSSENTI.

Witnesses:
M. I. LEWIS,
BENNETT S. JONES.